United States Patent [19]

Baker

[11] 4,288,459

[45] Sep. 8, 1981

[54] LOW FAT IMITATION SOUR CREAM

[75] Inventor: Donald B. Baker, Tulsa, Okla.

[73] Assignee: The Pro-Mark Companies, Tulsa, Okla.

[21] Appl. No.: 80,150

[22] Filed: Sep. 28, 1979

[51] Int. Cl.³ .......................... A23C 9/12; A23C 3/08; A23C 23/00

[52] U.S. Cl. ...................................... 426/43; 426/34; 426/35; 426/334; 426/583

[58] Field of Search ..................... 426/34, 38, 43, 583, 426/582, 334, 35, 39

[56] References Cited

U.S. PATENT DOCUMENTS

| | | | |
|---|---|---|---|
| Re. 27,381 | 5/1972 | Little | 426/334 |
| 3,235,387 | 2/1966 | Stumbo et al. | 426/43 |
| 3,359,116 | 12/1967 | Little | 426/583 |
| 3,929,892 | 12/1975 | Hynes et al. | 426/582 |
| 3,969,534 | 7/1976 | Parey et al. | 426/583 X |

*Primary Examiner*—David M. Naff
*Attorney, Agent, or Firm*—Sixbey, Friedman & Leedom

[57] ABSTRACT

A low fat imitation sour cream is prepared by mixing a heated milk-stabilizer mixture with about 40 to 70% bakers cheese curd by weight of the mixture to form a mixture containing less than about 2% fat by weight, adding a lactic acid producing bacteria culture, flavorants comprising at least one edible acid, lipase modified butterfat and starter distillate, and a preservative, and thereafter homogenizing the resultant mixture.

12 Claims, No Drawings

LOW FAT IMITATION SOUR CREAM

DESCRIPTION

BACKGROUND OF THE INVENTION

1. Field of the Invention

The present invention relates generally to a method for making a sour cream type product having the appearance, taste, consistency and texture of sour cream and, more specifically, to a method for making an imitation sour cream product which may be carried out in significantly less time than previously known methods and results in a sour cream type product significantly lower in fat and calories than with previously known methods.

2. Description of the Prior Art

Commercial sour cream, which is a popular ingredient in salad dressings, dips, fillings and like food products, is typically prepared by innoculating pasteurized, homogenized cream having a fat content of about 18% by weight with one or more strains of a lactic acid producing bacterial culture, ripening the cultured cream for about 14 hours at about 70° F., and cooling and packaging the resulting product. Although this method results in a highly acceptable product with a pleasing taste, sour cream prepared according to this method is high in both fat and calories; hence, those who must restrict their intake of fat and/or calories must either severely limit or cease altogether their intake of sour cream and sour cream—containing products. Imitation sour cream products which contain no dairy butterfat are disclosed, for example, in U.S. Pat. No. Re. 27,381. However, these products contain other fats and oils, usually at a level of from 8% to 25% by weight of the product, and therefore are not sufficiently low in either calories or fat.

Another drawback to the conventional method of making sour cream lies in the amount of time required for incubation of the bacterial cultures which produce the lactic acid responsible for the characteristic cultured taste in the finished sour cream product. Efforts have been made to circumvent this time consuming process by the direct acid method which involves adding acid directly to the cream or other equivalent dairy or non-dairy starting materials. Exemplary direct acid methods are disclosed in U.S. Pat. Nos. 3,355,298; 3,359,116; 3,378,375; 3,432,306; 3,506,663; 3,726,690 and Re. 27,381. The majority of these processes, however, either take several hours of processing time or result in a product with a higher fat content than desirable or both. In some, additional chemical additives or processing stages are required to even approach a high quality sour cream type product such as is made by biological fermentation. For example, U.S. Pat. No. 3,359,116 discloses a low calorie sour cream product produced by replacing the butterfat in the milk base starting material with at least 0.5% and up to 25% by weight of a lipoid substance and incorporating a suitable monoglyceride as an acid stabilizing and body building agent. By way of further example, U.S. Pat. No. Re. 27,381 discloses a method for making an imitation sour cream product which can be practiced in about an hour, but which requires inclusion in the product of 8% to 25% by weight of a suitable fat.

U.S. Pat. No. 3,235,387 to Stumbo is illustrative of current methods for the production of sour cream products which utilize acid-producing bacterial cultures. Although the use of stabilizers in these current methods results in an improved product over that achieved by earlier methods using bacterial cultures, processing time is still necessarily quite lengthy since the cultured cream mixture must be allowed to incubate for about 14 hours. In addition, the resulting sour cream product is high in both fat and calories, since the required starting material is cream standardized to 18% to 25% by weight fat. Pavey et al. disclose a method of making a low fat, shelf stable biologically fermented sour cream type product in U.S. Pat. No. 3,969,534. Although Pavey et al. uses a dairy base starting material with a butterfat content of 0% to 5% by weight, the processing of this dairy material to achieve the desired end product, requires considerable time and involves a multiplicity of process steps. For example, the dairy base starting material is homogenized, pasteurized, cooled to incubation temperature, innoculated with culture and allowed to stand for about 4 hours, after which stabilizers are mixed in and a second heating step is carried out for a time sufficient to produce syneresis. The mixture is then homogenized, flavors are added, the acidity is adjusted and the final product is packaged and specially processed to render it stable without refrigeration.

SUMMARY OF THE INVENTION

It is, therefore, a primary object of the present invention to provide a method for making a biologically fermented low fat imitation sour cream product which employs relatively few processing steps and may be carried out in less time than heretofore known methods of making biologically fermented sour cream products.

It is another important object of the present invention to provide a dairy product based, biologically fermented sour cream type product which resembles conventional sour cream in appearance, texture and taste, but which has a fat content substantially below that of conventional sour cream and existing imitation sour cream products.

It is another object of the present invention to provide a dairy product based, biologically fermented sour cream type product which has the cultured taste characteristic of conventional sour cream and which has a fat content of not more than about 2% by weight.

Other objects and advantages will become apparent from the following description and amended claims.

In accordance with the aforesaid objectives, the present invention provides a process for making a low calorie, low fat sour cream type product resembling sour cream in appearance, texture and taste which includes the steps of admixing one or more milk products selected so that the butterfat content in the final product does not exceed 2% by weight and the solids level does not exceed 20% by weight with at least one stabilizer and heating the mixture in the range from about 150° to 180° F. (65.5° to 82.2° C.), preferably about 165° to 175° F. (73.9° to 79.4° C.), with constant agitation. Desirably, while the mixture continues to be agitated, other conventional ingredients intended to increase the product's shelf life and improve its taste are added. Such additional common ingredients may include preservatives, flavorings and the like. Bakers or cottage cheese curd, which is the major constituent of the sour cream type product prepared hereby and which, together with the milk, comprises at least 98% by weight of the sour cream type product, is added to the mixture and the temperature of the mass is adjusted to and maintained at not less than about 70° to 130° F. (21.1° to 54.4° C.), preferably about 90° to 110° F. (32.2° to 43.3° C.). Additional flavorings, particularly those which are temperature sensitive, and suitable bacterial cultures may be added once the mixture achieves the desired 70° to 130° F. (21.1° to 54.4° C.), temperature range. The resulting substantially uniform mixture is pumped to a homogenizer where it is homogenized under conventional elevated pressure conditions of 500 to 5000 psig (35.15 to 351.5 kg/cm$^2$), desirably 1000–2000 psig (70.03 to 140.06 kg/cm$^2$) and preferably 1200 to 1500 psig (84.36 to 105.45 kg/cm$^2$). After homogenization, the sour cream product is packaged in a conventional manner and refrigerated.

The sour cream type product of the present invention comprises a major amount of pasteurized, homogenized cultured low fat milk and minor amounts of bacterial culture, flavorants, stabilizers and preservatives. Most importantly, the product of the present invention has a total fat content by weight of less than about 2%, preferably less than about 1.5% and most preferably about 0.5% to 1.0% fat, and contributes only about 60 calories per serving (about 20 to 25 calories per ounce) to the diet. It is a smooth, palatable product resembling sour cream in appearance, texture and taste. Desirably, the product has a pH in the range 4.2 to 5.0, preferably 4.4 to 4.8 and a total solids content of about 16% to 20%, optimally about 17%.

DETAILED DESCRIPTION OF THE INVENTION

The present invention relates broadly to a dairy product based, biologically fermented imitation sour cream product which resembles sour cream in appearance, texture and taste, but which has a fat content which is substantially reduced below the fat content of conventional sour cream. Hence, the imitation sour cream made by the process of the present invention is a desirable component of the diet of persons wishing to decrease their caloric intake and to reduce the fat content of their diet. Moreover, the method of the present invention, although it utilizes bacterial cultures to achieve the cultured taste characteristic of conventional sour cream, includes fewer processing steps and requires far less time than previously known methods for making either conventional or imitation sour cream and is, as a result, more economical.

The process by which the unique imitation sour cream product of the present invention is made involves admixing low fat milk, at least one stabilizer and flavorings at a temperature ranging from about 150° to 180° F. (65.5° to 82.2° C.), preferably about 165° to 175° F. (73.9° to 79.4° C.), and adding bakers cheese curd while adjusting the resulting temperature to the range of about 70° to 130° F. (21.1° to 54.4° C.), preferably about 90° to 110° F. (32.2° to 43.3° C.). In this 70° to 130° F. (21.1° to 54.4° C.) temperature range the temperature is high enough to prevent stabilizers from setting, yet low enough that temperature sensitive flavorants, such as those that are volatile, acids, and bacterial cultures can be added without deleterious effects on flavor and texture. Agitation of the mixture is continuous throughout the process so that after the addition of the cheese curd, culture and temperature sensitive flavorants, the final mix is substantially uniform and readily pumpable to a homogenizer for high pressure homogenization.

In order to prepare an imitation sour cream product having a fat content not greater than about 2% by weight, the fat contributing ingredients, primarily the milk, must be selected to achieve this result. It should also be recognized that many dairy flavorants which might be used can contribute to the fat content of the final product. However, since these flavorants are usually employed only in very small quantities, their contribution to the final fat content may not be significant.

The term "milk" as used herein means the conventional milk of commerce which may have a butterfat content ranging from as low as 0.1% up to 7%. Within this range are conventional skim milk (less than about 0.5% by weight butterfat) and conventional full fat milk (up to about 3.5% by weight butterfat). Preferred for use in the process of the present invention, however, are milk products with a butterfat content of less than about 2% by weight. The term "milk" also contemplates combinations of various butterfat content milks and equivalent compositions formed by suitable admixtures of milk solids and water.

The major ingredient of the sour cream type product of the present invention is bakers cheese or small curd drained, uncreamed cottage cheese made from skim milk. Preferably, bakers cheese with a small curd to facilitate homogenization is employed. These cheese ingredients generally comprise about 15% to 25% by weight non-fat milk solids and about 75% to 85% water. When used hereinafter, the term "bakers cheese" is intended to refer to either a bakers cheese or cottage cheese curd product having the foregoing characteristics. It will be appreciated that various proportioned mixtures of milk and bakers cheese can achieve a desired fat content within the desired range of less than about 2% fat by weight. However, it should also be recognized that it is important to develop a suitable fluidity in the mixture for ease of processing and, ultimately, to develop the desired texture in the sour cream type product. Therefore, the selection of milk and bakers cheese proportions should take into account the importance of maintaining a convenient moisture content in the mixture during processing as well as the need for achieving a particular fat content.

To prepare the imitation sour cream product of the present invention, the milk component is admixed with a stabilizer and, if desired, salt, usually in a stainless steel vat or like mixing container, and heated to a temperature in the range 150° to 180° F. (65.5° to 82.2° C.), preferably 165° to 175° F. (73.9° to 79.4° C.), for a time sufficient to achieve complete blending of the ingredients and to effect pasteurization. The heating time and the temperature to which the mixture is heated are inversely related with increased temperatures requiring decreased heating times. Experience has indicated that heating at about 175° F. (79.4° C.) for about 15 minutes is sufficient to achieve the desired purpose. At lower temperatures heating may continue for up to about one hour. Heating is typically indirect and is accomplished by passing pressurized steam through conduits which jacket or are disposed within the mixing vat. Therefore, relatively close temperature control can be maintained by controlling steam flow through the conduits. Mixing of the ingredients may be accomplished in any desired fashion, e.g., by paddle blender agitation, use of recirculating pumps, or both.

It is preferred to use as the milk component a mixture of 2% by weight butterfat milk and 0.5% by weight butterfat milk. A desirable and useful ratio of the various milks is about 3–4 parts by weight of the 2% butterfat milk for each part by weight of the 0.5% butterfat milk. Preferably, about 3.5 parts of the 2% milk to 1 part of the 0.5% milk, is employed in the initial admixture. However, the process of the present invention contemplates the use as starting materials of any combination of various butterfat content milks which, taking into account the bakers cheese content, will result in a fat content in the final product within the prescribed range. For example, milk with a butterfat content of about 3% might be used in combination with non-fat dry milk solids and water. However, in such instances care must be taken to observe the desired solids level in the final product of 16% to 20% by weight. In addition, as previously indicated, it is important to achieve a suitable fluidity in the mixture to maintain ease of processing and, ultimately, to develop the desired texture in the sour cream type product.

The stabilizer or combination of stabilizers employed may be selected from any of a number of commercially available dairy product stabilizer bases. Typically useful stabilizers contain hydrocolloids such as fruit pectin, pectic acid, alginic acid (as well as suitable sodium and calcium compounds), tetrasodium pyrophosphate, agar-agar, carageenan, guar meal or flour, carob-bean meal or flour, locust bean gum, xanthan gum, enriched starches, and starch meal or flour. Some of these stabilizers perform their function more effectively in an acid mixture, such as is encountered in preparing the sour cream type product of the present invention. Care should be taken, therefore, to select one of the more acid stable stabilizers. Preferred stabilizers which have been found to work well in the process of the present invention are locust bean gum and xanthan gum.

To the heated and agitated mixture of milk and stabilizer is added small curd bakers cheese in sufficient quantity so that the bakers cheese curd comprises about 40 to 70% by weight, preferably about 52 to 56% by weight, of the total ingredient mix, (excluding preservatives and flavorants). Agitation of the mixture is continuous to allow the curd to become substantially completely coated and intermingled with the milk-stabilizer mixture which serves as a dressing therefor. Since the bakers cheese curd was likely to have been refrigerated at about 40° F. prior to use, the addition of the bakers cheese curd will cause the overall temperature of the mixture to decrease substantially. Therefore, close temperature monitoring and control should be practiced to maintain the mixture at a temperature not less than 70° to 130° F. (21.1° to 54.4° C.), preferably 90° to 110° F. (32.2° to 43.3° C.). If the temperature drops below about 70° F. (21.1° C.), the stabilizer will begin to set, resulting in destruction of the desired texture. Moreover, bacterial cultures which are added as flavorants do not function as effectively at temperatures below about 70° F. (21.1° C.) and function at reduced efficiency below about 90° F. (32.2° C.). At temperatures above 130° F. (54.4° C.), certain flavorants may be volatilized and bacterial cultures are likely to be killed.

Preservatives and flavorants may be added at any point in the process, e.g., to the milk-stabilizer mixture prior to the addition of the bakers cheese curd or to the milk-stabilizer dressed curds, or to both, depending upon the temperature sensitivity of the additives and the convenience of addition. Thus, it is desirable to add flavorants and preservatives which will not be volatilized or rendered ineffective by high temperatures directly to the milk-stabilizer mixture since the heat, together with the continuous agitation, facilitates their dissolution in the mixture.

Any conventional, food grade, FDA approved preservative may be employed to inhibit mold formation and other deterioration and to increase shelf life. Typical of the desirable preservatives is potassium sorbate, a well-known bacteriostat, antioxidant and mold inhibitor. Other suitable preservatives, e.g., benzoate of soda, may also be used effectively. Typically, preservatives are employed in only trace quantities, e.g., about 0.1% by weight of the total ingredient mixture.

Likewise, any food grade, FDA approved flavorant may be used to adjust the taste of the imitation sour cream product. Inasmuch as flavoring is a very subjective area, and since tastes differ so widely, each producer of imitation sour cream will select flavorants in a combination which is believed to approximate most closely the distinctive cultured taste characteristic of conventional sour cream. It should be noted that while there are no flavorants whose use is indispensable to producing an acceptable product, experience has suggested that the use of certain flavorants facilitates the achievement of a product which closely resembles conventional sour cream. For example, the use of salt (sodium chloride) in combination with concentrated dairy flavorings, which may be added to the mixture prior to the addition of the bakers cheese curd, has yielded good results. Exemplary of such flavorants which may be desirable for use are concentrated cultured dairy flavorings comprising lipase modified butterfat products which are rich in volatile, flavorful fatty acids. One such product is commercially available from Dairyland Food Laboratories under the trade designation "LBO 50." Flavorants are typically employed in quantities ranging from trace amounts up to about 2% by weight of the final ingredient mix.

When temperature sensitive flavorants are used, they should not be added until the temperature of the milk-stabilizer dressed bakers cheese curd has been reduced to the 70° to 130° F. (21.1° to 54.4° C.) range. Although acid is not usually a temperature sensitive flavorant, it has been found that the addition of acid flavorants at too high a temperature will prevent the formation of the desired texture in the product of the present invention. Therefore, it is preferred to add acids after reduction of the temperature to the prescribed range. Any one or combination of edible, food grade, FDA approved acids, such as citric acid, lactic acid, phosphoric acid or acetic acid may be selected to enhance the taste of the sour cream type product of the present invention. However, experience has shown that the use of one of the aforementioned acids in combination with a commercially available mixture of common dairy acids, such as Sour Cream Acid #22 made by Stabilized Products, Inc. facilitates the achievement of a characteristic sour cream taste. Illustrative of other temperature-sensitive flavorants which may be used to enhance the product of the present invention are starter distillate and diacetyl.

Cultures of lactic acid producing bacteria, which are used primarily to assure a rich, cultured cream taste in the product of the present invention, may be added only after the temperature of the milk-stabilizer dressed cheese curd mixture has been reduced to the 70° to 130° F. (21.1° to 54.4° C.) range, preferably to between about 90° and 110° F. (32.2° to 43.3° C.). Exemplary of useful commercially available cultures are those containing streptococcus diacetilactus, although other lactic acid producing bacterial cultures can be used successfully. The culture acts to impart a desired sour cream like flavor to the product so long as temperatures are maintained above about 50° F. (10° C.). Thus, the culture contributes to product flavor throughout subsequent blending and homogenization steps. Once the product has been refrigerated, however, further bacterial action effectively ceases. By adding the bacterial culture at this point in the process and allowing it to contribute its flavor influence during subsequent processing, it has been found that substantially the same flavor benefit can be achieved as with prior art multi-hour incubation processes without the disadvantages inherent in lengthy incubation processes.

After all desired ingredients have been throughly admixed, which generally requires about 15 minutes of blending at temperatures maintained between about 70° and 130° F. (21.1° to 54.4° C.), a substantially uniform and fluid mix is formed which can be directed, preferably by pumping, to a conventional homogenizer unit. In the unit the mixture is homogenized at pressures in the general range of 500 to 5000 psig (35.15 to 351.5 kg/cm$^2$), desirably between 1000 and 2000 psig (70.03 to 140.06 kg/cm$^2$) and preferably between 1200 and 1500 psig (84.36 to 105.45 kg/cm$^2$). The resulting product has a smooth, creamy appearance and a texture and taste very closely approximating that of conventional sour cream. The homogenized product is packaged in conventional manner for sour cream and stored under refrigeration. The usual shelf life of the sour cream type product of the invention when stored at standard refrigeration temperatures is about 60 days.

The following example illustrates the practice of the present invention and is intended to exemplify and not to limit in any respect the content and scope thereof.

EXAMPLE

The following ingredients were mixed in the amounts indicated in a stainless steel vat equipped with an agitator:

milk (2% butterfat): 1720.0 lbs. (774 kg)
skim milk (less than 0.5% butterfat): 500.0 lbs. (225 kg)
stabilizer, consisting of locust bean gum: 22.5 lbs. (10.1 kg)
salt: 15.0 lbs. (6.75 kg)

Mixing was carried out using paddle blenders and a recirculating pump while the contents of the vat were heated by pressurized steam in the vat jacket to 175° F. (79.4° C.). After 15 minutes the pump was shut down and only blender agitation continued. Steam flow through the jackets was cut off and the contents of the vat allowed to cool down. To the milk-stabilizer-salt mixture, the following preservative and flavoring ingredients were added in the amounts noted:

potassium sorbate: 5.0 lbs. (2.25 kg)
Dairyland Food Labs "LBO 50" flavoring: 40.0 lbs. (18 kg)

The mixture was constantly agitated during addition of the above ingredients. Temperature was monitored to assure that the temperature of the mixture remained above 90° F. (32.2° C.). 2,675 pounds (1203.75 kg) of refrigerated (40° F.) (4.4° C.) small curd bakers cheese was then stirred into the already admixed ingredients. Steam flow through the jackets was resumed to maintain the temperature at about 90° to 95° F. (32.2° to 35° C.). Agitation was continued to permit the bakers cheese curd to become intimately intermingled and coated with the milk-stabilizer-flavored dressing. The following ingredients were then added in the amounts indicated:

citric acid: 7.5 lbs. (3.37 kg)
Stabilized Products, Inc. Sour Cream Acid #22: 15.0 lbs. (6.75 kg)
Starter Distillate: 6.5 oz. (0.18 kg)
Streptococcus diacetilactus culture: 10.0 oz. (0.28 kg)

Blending was continued for at least an additional 15 minutes to assure formation of a uniform, fluid, readily pumpable mix. The resulting mixture was pumped to a homogenizer where it was homogenized at between 1200 psig and 1500 psig (84.36 to 105.45 kg/cm$^2$) before being packaged and refrigerated. The final product resembled sour cream in color, appearance, texture and taste, contained about 1.0% fat, about 17% solids and had a pH of about 4.6. The imitation sour cream product contained 9 grams of protein, 3 grams of carbohydrate, 1 gram of fat and 60 calories in each ⅓ cup sized serving.

While the present invention has been described with reference to specific embodiments thereof, it will be understood that numerous modifications may be made by those skilled in the art without actually departing from the scope of the claimed invention. Accordingly, all modifications and equivalents may be resorted to which fall within the scope of the invention as claimed.

I claim:

1. A method for making a low fat milk product which resembles sour cream in appearance, texture and taste comprising the steps of:
    (a) admixing milk having a butterfat content of 0.7 to 7% by weight and a stabilizer;
    (b) heating said mixture to a temperature in the range of from about 150° to 180° F. (65.5° to 82.2° C.) for a time sufficient to form a uniform, substantially homogeneous mixture and to effect pasteurization;
    (c) admixing bakers cheese curd and the resultant milk-stabilizer mixture from step (b) to coat said bakers cheese curd therewith and to form a bakers cheese curd mixture, said bakers cheese comprising about 40 to 70% by weight of said mixture and the relative proportions of milk and bakers cheese curd being selected to provide a fat content in said product of less than about 2% by weight;
    (d) agitating said curd mixture to a substantially uniform and fluid consistency;
    (e) maintaining said curd mixture at a temperature in the range of 70° to 130° F. (21.1° to 54.4° C.) and adding thereto a lactic acid producing bacterial culture;
    (f) adding flavorants comprising at least one edible acid, lipase modified butterfat and starter distillate and a preservative at any time after step (b) and prior to step (g); and
    (g) homogenizing said bacterial culture, flavorant and preservative containing bakers cheese curd mixture at pressures in the range of 500 to 5000 psig (35.15 to 351.5 kg/cm$^2$).

2. A method, as claimed in claim 1, wherein said milk and bakers cheese curd proportions are selected to provide a fat content of less than 1.5% by weight in said product.

3. A method, as claimed in claim 1, wherein said milk-stabilizer mixture is heated to a temperature in the range of 165° to 175° F. (73.9° to 79.4° C.).

4. A method, as claimed in claim 1, wherein said milk-stabilizer mixture is heated to about 175° F. (79.4° C.) for about 15 minutes.

5. A method, as claimed in claim 1, wherein said bakers cheese curd mixture is maintained at a temperature in the range of 90° to 110° F. (32.2° to 43.3° C.).

6. A method, as claimed in claim 1, wherein said added flavorants include salt.

7. A method, as claimed in claim 1, wherein said at least one edible acid includes citric acid.

8. A method, as claimed in claim 1, wherein said preservative comprises potassium sorbate.

9. A method, as claimed in claim 1, wherein said homogenization pressure is in the range of 1200 to 1500 psig (84.36 to 105.45 kg/cm$^2$).

10. A method, as claimed in claim 3, wherein said bakers cheese curd mixture is maintained at a temperature in the range of 90° to 110° F. (32.2° to 43.3° C.); said flavorants further include salt and said at least one edible acid comprises a mixture of edible acids, one of said acids being citric acid.

11. The product of the process of claim 1.

12. The product of the process of claim 10.

* * * * *